(12) United States Patent
Grayson, II et al.

(10) Patent No.: US 6,419,290 B1
(45) Date of Patent: Jul. 16, 2002

(54) FOOT PLATE ATTACHMENT FOR A SHOVEL

(75) Inventors: Henry C. Grayson, II, Plano; Wayne R. Shaw, Richardson, both of TX (US)

(73) Assignee: Outdoor Intelligence Corporation, Dallas, TX (US)

( * ) Notice: Subject to any disclaimer, the term of this patent is extended or adjusted under 35 U.S.C. 154(b) by 0 days.

(21) Appl. No.: 09/711,356

(22) Filed: Nov. 9, 2000

(51) Int. Cl.$^7$ ................................................. A01B 1/00
(52) U.S. Cl. ....................................................... 294/60
(58) Field of Search ............................. 294/49, 59, 60; 76/113; 254/131.5

(56) References Cited

U.S. PATENT DOCUMENTS

| | | | | |
|---|---|---|---|---|
| 493,110 A | * | 3/1893 | Orthwein | 294/60 |
| 678,373 A | * | 7/1901 | Blaser | 294/60 |
| 1,018,424 A | * | 2/1912 | Jewett | 294/60 |
| 1,119,605 A | * | 12/1914 | Hunt | 294/60 |
| 1,346,870 A | * | 7/1920 | Zaokipny | 294/60 |
| 5,503,445 A | * | 4/1996 | Fontaine | 294/60 |

FOREIGN PATENT DOCUMENTS

SE 113646 * 3/1945 .................. 294/60

* cited by examiner

Primary Examiner—Dean J. Kramer
(74) Attorney, Agent, or Firm—John E. Vandigriff

(57) ABSTRACT

A foot plate attachment has a pressure plate that resides on the top of the shovel blade, and has a support piece under the pressure plate. The support may be integral with the pressure plate or may be a separate insert piece that is attached in an opening in the foot plate and at least partially resides in the recess or irregular area located at the top center of the blade and below the portion of the blade into which a handle is inserted. The insert may have a screw or bolt that is moved against the shovel in the recess below the handle to hold the foot plate and insert securely in place. Since the foot plate attachment is resting on top of the shovel blade, it cannot move downward, and since the insert is in the recess or has a screw tightened against the shovel, the foot plate attachment is held in place when secured to the insert.

14 Claims, 9 Drawing Sheets

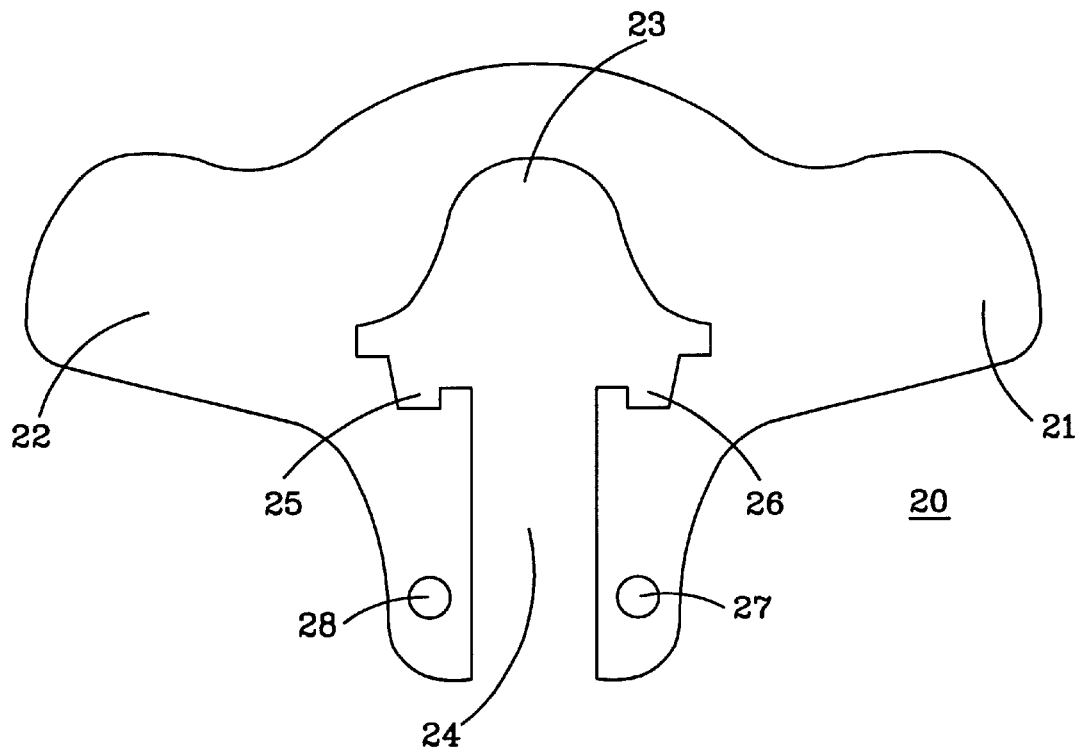
FIG. 3
FIG. 2
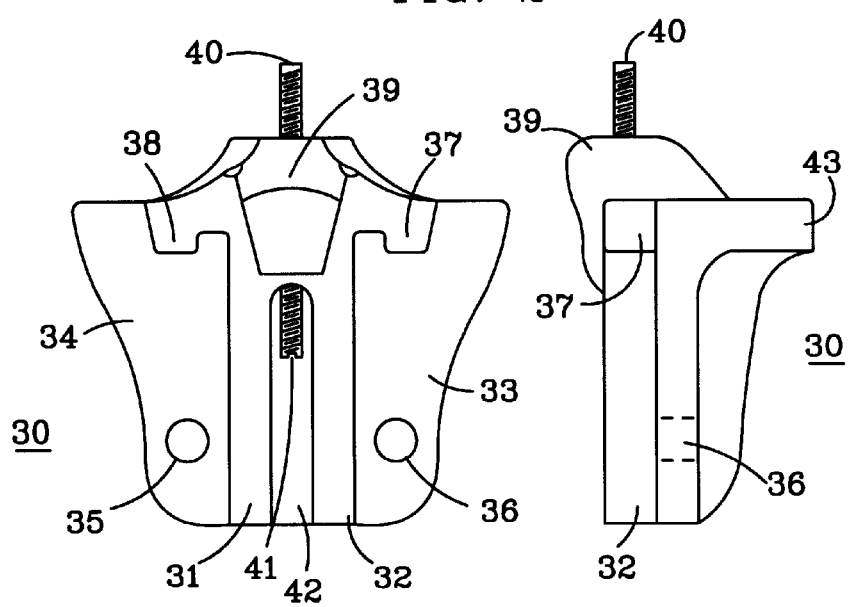
FIG. 4
FIG. 5

FOOT PLATE ATTACHMENT FOR A SHOVEL

FIELD OF THE INVENTION

The invention relates to shovel and digging instruments, and more particularly to a foot plate attachment for a shovel.

BACKGROUND OF THE INVENTION

Shovels have a formed blade with a portion of the top of the blade is reinforced or folded over to provide a reenforced portion to which a foot is applied to force the shovel blade into the ground. A portion of the blade material is formed above the area to which the foot is applied to hold a handle, and below the portion formed to hold the blade is a recess or irregular area to reenforce the blade. If the ground is compacted or a clay soil, it is difficult to force the blade into the ground and the narrow reenforced folded portion may apply excess pressure on the foot through the sole of the shoe.

U.S. Pat. No. 5,502,445, utilizes a plate which resides on the portion of the shovel to which the foot applies pressure during digging, and a curved portion extends upward partially around the shovel handle and is attached thereto by a U-bolt.

U.S. Pat. No. 5,901,996, describes a foot plate attachment that is similar to that described in U.S. Pat. No. 5,502,445, and uses a hose clamp to hold the attachment to the shovel handle.

While both of the above described foot plate attachments, but neither describes a means to prevent the foot plate attachment from moving upward if the hose clamp or U-bolt becomes loose.

SUMMARY OF THE INVENTION

The invention is to a foot plate attachment which has a pressure plate that resides on the top of the shovel blade, and has a support piece under the pressure plate. The support may be integral with the pressure plate or may be a separate insert piece that is attached in an opening in the foot plate and at least partially resides in the recess or irregular area located at the top center of the blade and below the portion of the blade into which a handle is inserted. The insert may have a screw or bolt that is moved against the shovel in the recess below the handle to hold the foot plate and insert securely in place. Since the foot plate attachment is resting on top of the shovel blade, it cannot move downward, and since the insert is in the recess or has a screw tightened against the shovel, the foot plate attachment is held in place when secured to the insert.

In another embodiment of the invention, a second securing device may be used in conjunction with the foot plate attachment and the insert to secure the foot plate attachment in place.

In both embodiments, a large area is provide to press downward upon by the foot, both side and back, to help add an increased downward digging pressure, and provides a more stable area so that the shovel will not turn or rotate with the applied downward pressure.

BRIEF DESCRIPTIONS OF THE DRAWINGS

FIG. 2 is a top plate used with the foot attachment;

FIG. 3 is a side view of the top plate;

FIG. 4 is a top view of an insert device used on conjunction with the foot plate;

FIG. 5 is a side view of the insert device;

DESCRIPTION OF A PREFERRED EMBODIMENT

Figure 1:
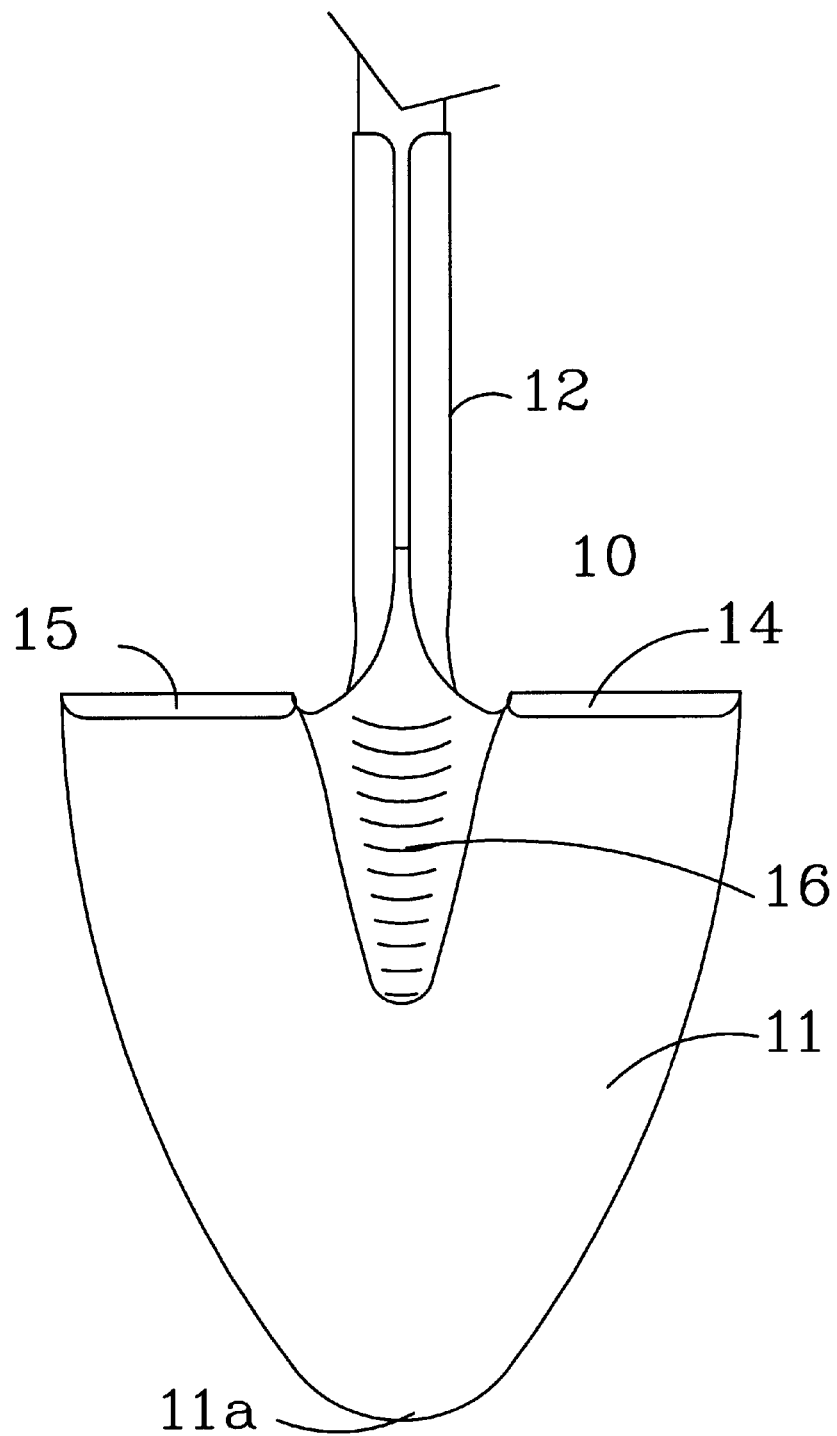
FIG. 1 shows a prior art shovel.

FIG. 1 shows a prior art shovel 10 which is formed from a single piece of metal, with a blade 11 having shoulders 14 and 15 which are formed by bending two separated edges to present a wider surface for applying pressure with the foot when digging with the shovel. Another portion of the shovel 12 is bent to form a partially closed cylinder into which a handle is inserted. To add strength to the shovel blade, a concave region 16, as viewed from the back of the shovel blade 11, is formed just below the handle area 12, and between the two shoulders 14 and 15.

When digging in hard earth, a lot of pressure must be placed on one of shoulders 14 and 15 to press the tip 11a of blade 11 into the earth. Since shoulders 14 and 15 have a narrow top surface, it is at times difficult to apply sufficient pressure on either shoulder 14 or 15 to press the blade 11 into the earth without applying undue pressure on the bottom of the foot. Also, when digging in hard earth, the shovel blade tends to pivot to the right or left if the foot is moved tangential to the ground.

FIG. 2 shows a top view of an attachment plate 20 that is to be attached to a shovel over the foot pressure shoulders 14 and 15 as illustrated in FIG. 1. Plate 20 has two elongated flat areas 21 and 22 that extend away from opening 23, thought which the shovel handle is inserted. Plate 20 has two notch openings 25 and 26 which mates with notches on insert 30 (FIGS. 4 and 5). Plate 20 has two openings 27 and 28 through which screws are inserted to attached to insert 30 which extends upward into channel 24. Plate 20 may have a textured or ribbed surface to provide friction so that when a foot is plated on plate 20, it does not slide on the surface of plate 20.

FIG. 3 is a side view of plate 20 showing that it is a flat plate. Channel 24 is shown between the two flat areas 21 and 22.

FIG. 4 is a top view of insert 30. Insert 30 has two raised ridges 31 and 32, divided by recess 42, that are placed in channel 24. Rounded end 39 is placed in opening 23 in plate 20, and notches 37 and 38 are placed in openings 25 and 26 in plate 20. Screw openings 35 and 36 align with openings 27 and 28 in plate 20. Either bolts, screws, or interlocking structure may be used to secure insert 30 and plate 20 together. If screws are used, then openings 27 and 28 would be threaded (not illustrated). Screw 40 is used to secure the assembly of plate 20 and insert 30 to shovel 10 by placing a screwdriver (not illustrated) in notch 41 of screw 40 and turning it until it engages the inside of concave region 16 on shovel 10 (FIG. 1).

FIG. 5 is a side view of insert 30, showing ridge 32, notch hole 36, rounded end 39 and screw 40.

Figure 6:
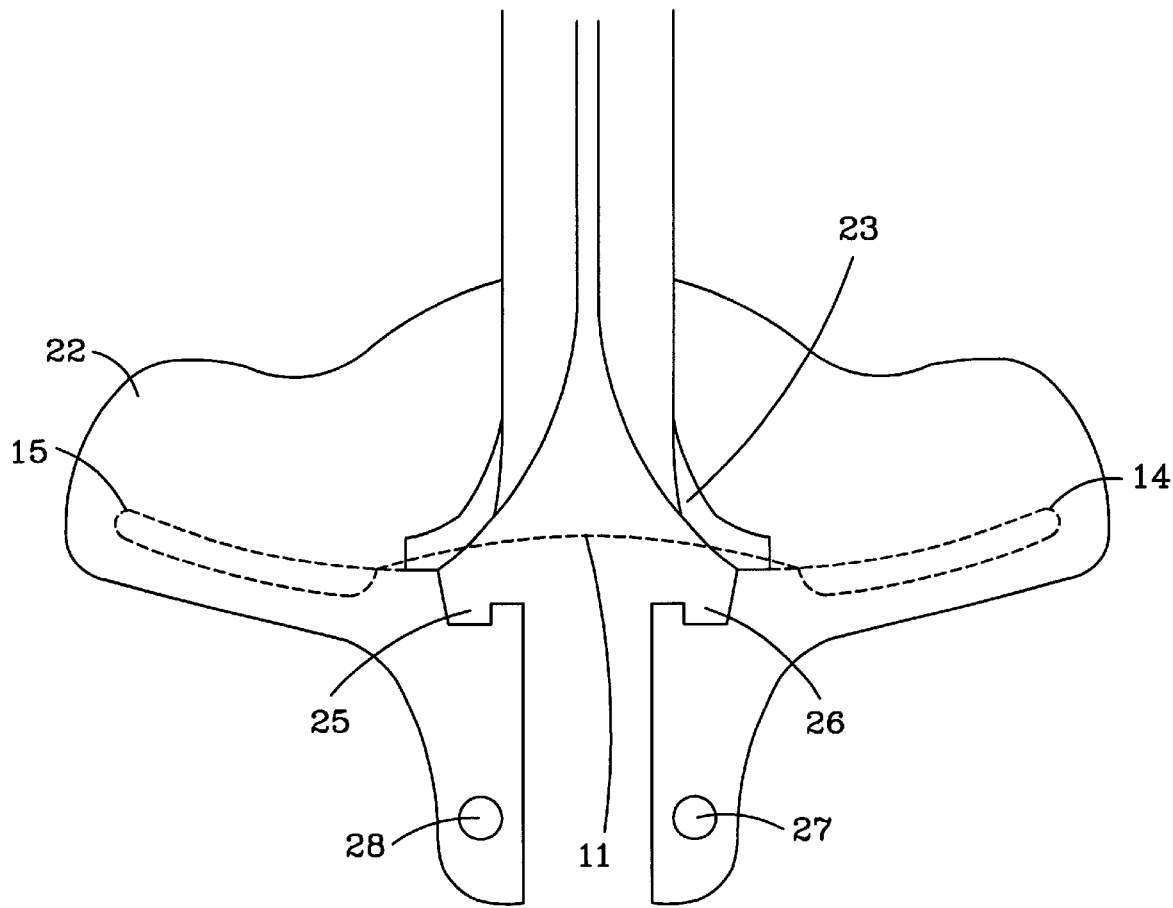
FIG. 6 shows the top plate of FIG. 3 on a shovel.

FIG. 6 Shows plate 20 mounted on shovel 10, with plate 20 on the two shoulders 14 and 15 (illustrated in dashed lines). Shovel handle 12 extends up through opening 23 of plate 20. Plate 20 is placed on shovel 10 by either sliding plate 20 on by inserting shovel handle horizontally through opening 24 of plate 20 (FIG. 2) or extending handle 12 up through opening 23 in plate 20.

Figure 7:
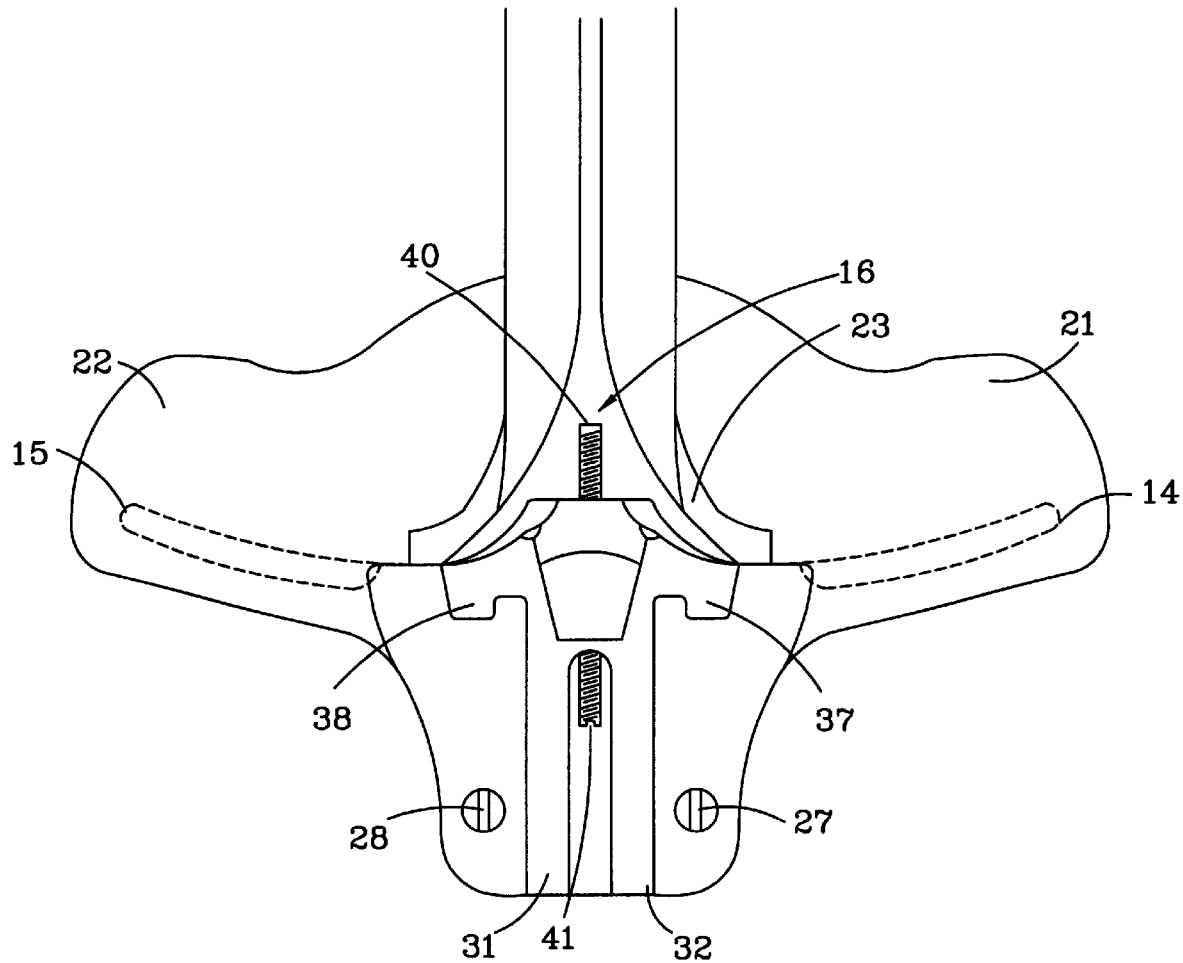
FIG. 7 shows the top plate and insert securely attached to a shovel.

In FIG. 7, insert 30, FIG. 4, is placed under plate 20 with ridges 31 and 32 extending upward in opening 24 of plate 20 (FIG. 2). Rounded end 39 extends toward the concave region 16 of shovel 10 (FIG. 1). Two screws or bolts 27a and 28a secure insert 30 to plate 20. Screw 40 is moved toward shovel 10 until it engages the concave region 16 of shovel 10. Screw 40 is tightened to lock plate 20 and insert 30 in place on shovel 10.

Figure 8:
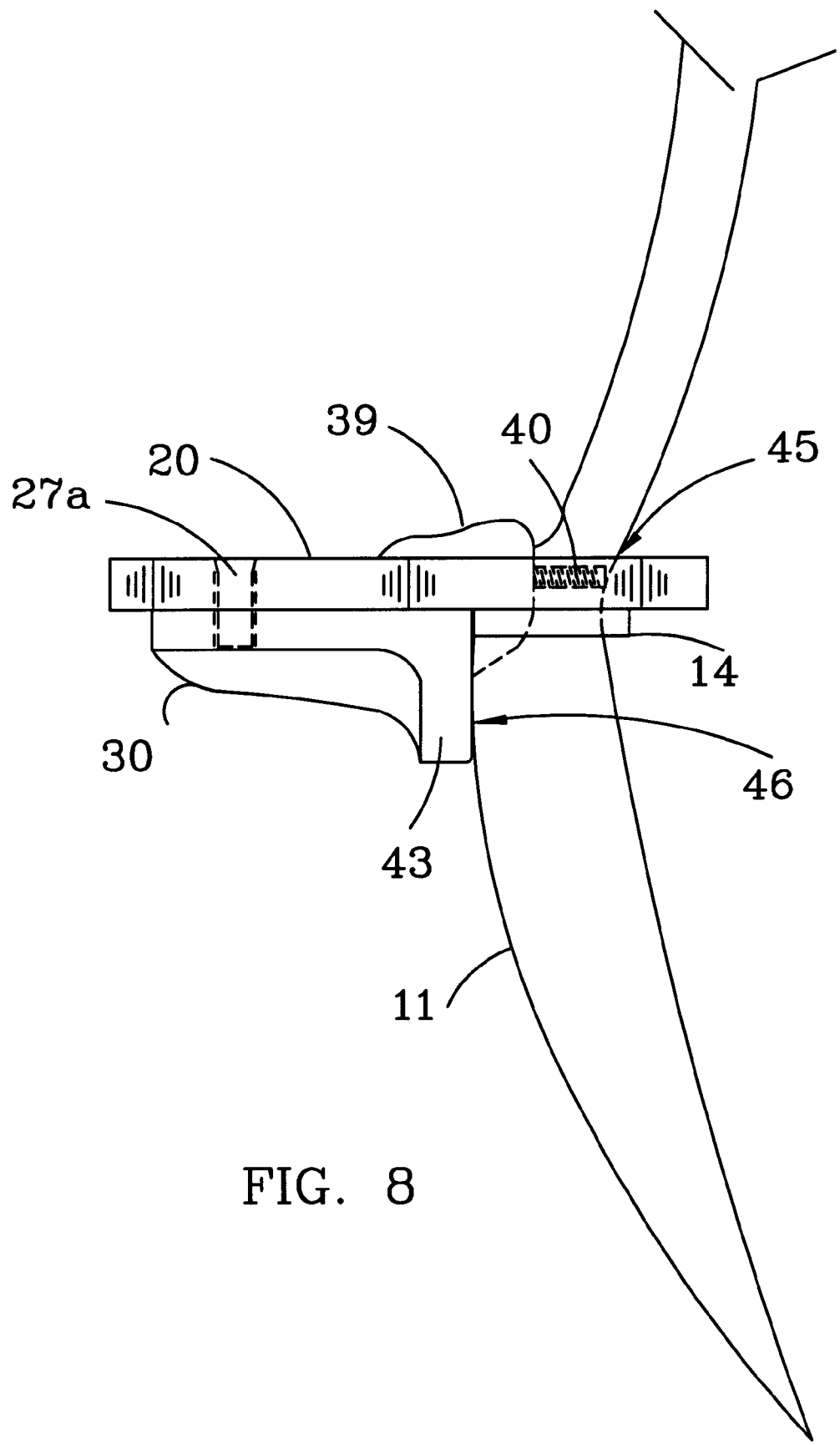
FIG. 8 is a side view of the plate and insert attached to a shovel.

FIG. 8 is a side view showing plate 20 and insert 30 are attached together and mounted on shovel 10. When screw 40 is tightened against the inside of the shovel, as indicated at 45, insert part 43 is against the back of shovel blade 11 at the point indicated at 46. In this position, and with plate 20 and insert connected by screws, see screw 27a, the two cannot move horizontally, left and right as viewed in FIG. 8. Also, the combination of plate 20 and insert cannot move upward since plate 20 engages the shovel handle at 45, nor can they move downward since plate 20 resides on the top of the shovel shoulders 14 and 15.

Figure 11:
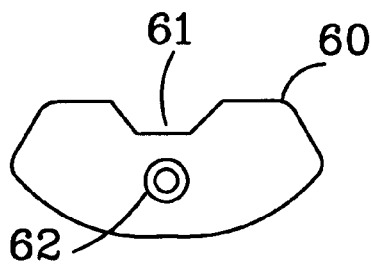
FIG. 11 is a cap used in conjunction with the plate of FIG. 9.
Figure 9:
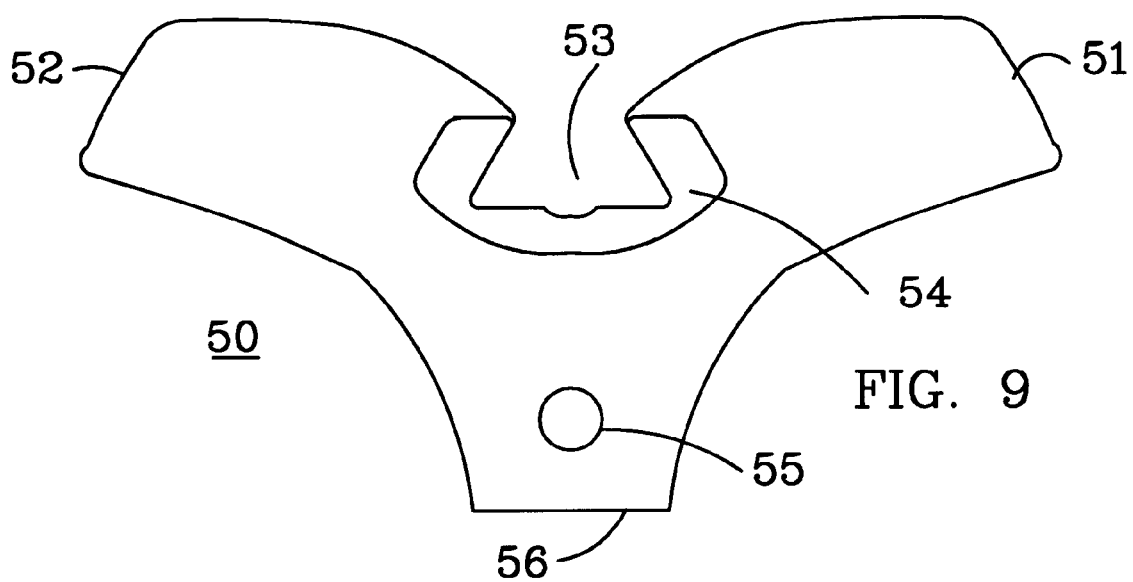
FIG. 9 is a top view of a plate of a second embodiment.
Figure 10:
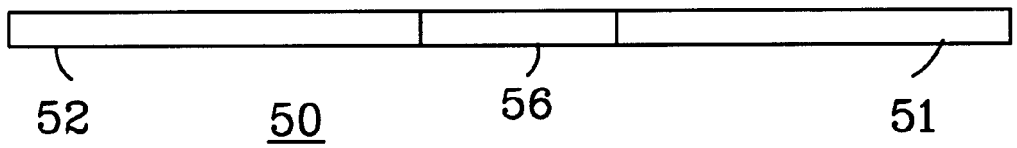
FIG. 10 is a side view of the plate of FIG. 9.

FIGS. 9 and 10 show part of a second embodiment for a shovel foot plate attachment. Plate 50 is generally T-shaped with top members 51 and 52 and a base member 56. Plate 50 has an opening 53 in which the shovel handle is placed. Partially surrounding opening 53 is a recessed area 54 in which is placed cap 60, shown in FIG. 11. Cap 60 has the same general shape a recess 54 and has hole 62 through which is placed a screw to attach it to bracket 65 described below with reference to FIG. 13. Concave area 61 in cap 60 allows the shovel handle to extend into cap 60.

Figure 12:
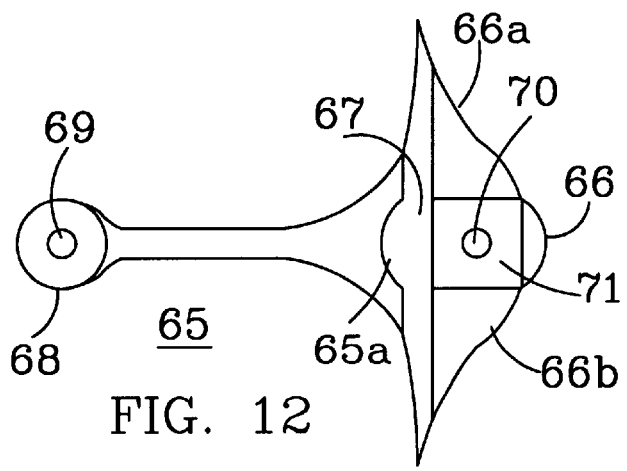
FIGS. 12, 13 and 14 are top side, and front views of a support device.
Figure 13:
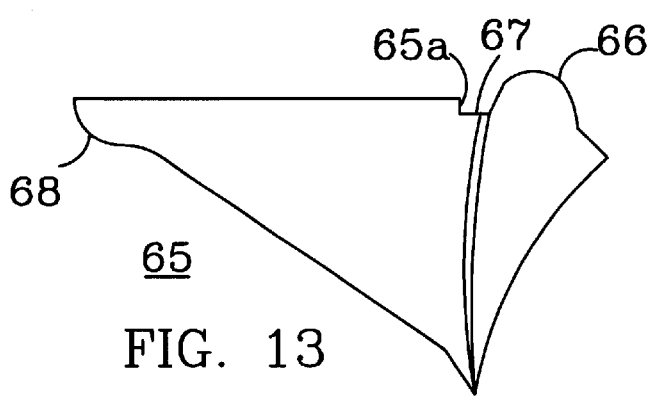
Figure 14:
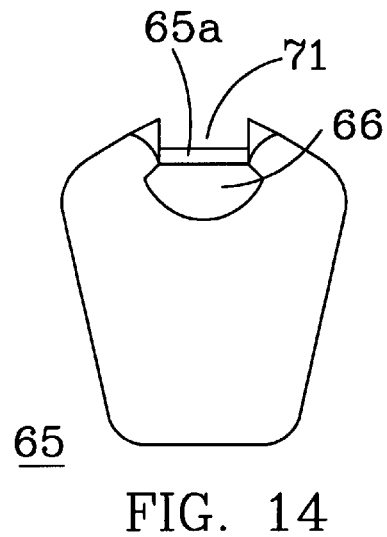

FIGS. 12, 13 and 14 are top, side and front views of a support bracket 65 which is mounted under and secured to bracket 50 (FIG. 9). Bracket 65 has an end made up of parts 66, 66a and 66b which are inserted into the concave portion 16 of the back shovel 10 (FIG. 1). Part 66 extends upward into the handle area 12a when mounted on shovel 10. End 68 of part 65 extends under and is secured to plate 50 by a screw or bolt (not illustrated) that is inserted through hole 55 in plate 50 and screwed into threaded hole 69 in end 68 of bracket 65. Plate is held against, and in place, by cap 60 by a screw (not illustrated) that extends though hole 62 in cap 60 and into threaded hole 70 in bracket 65.

Figure 15:
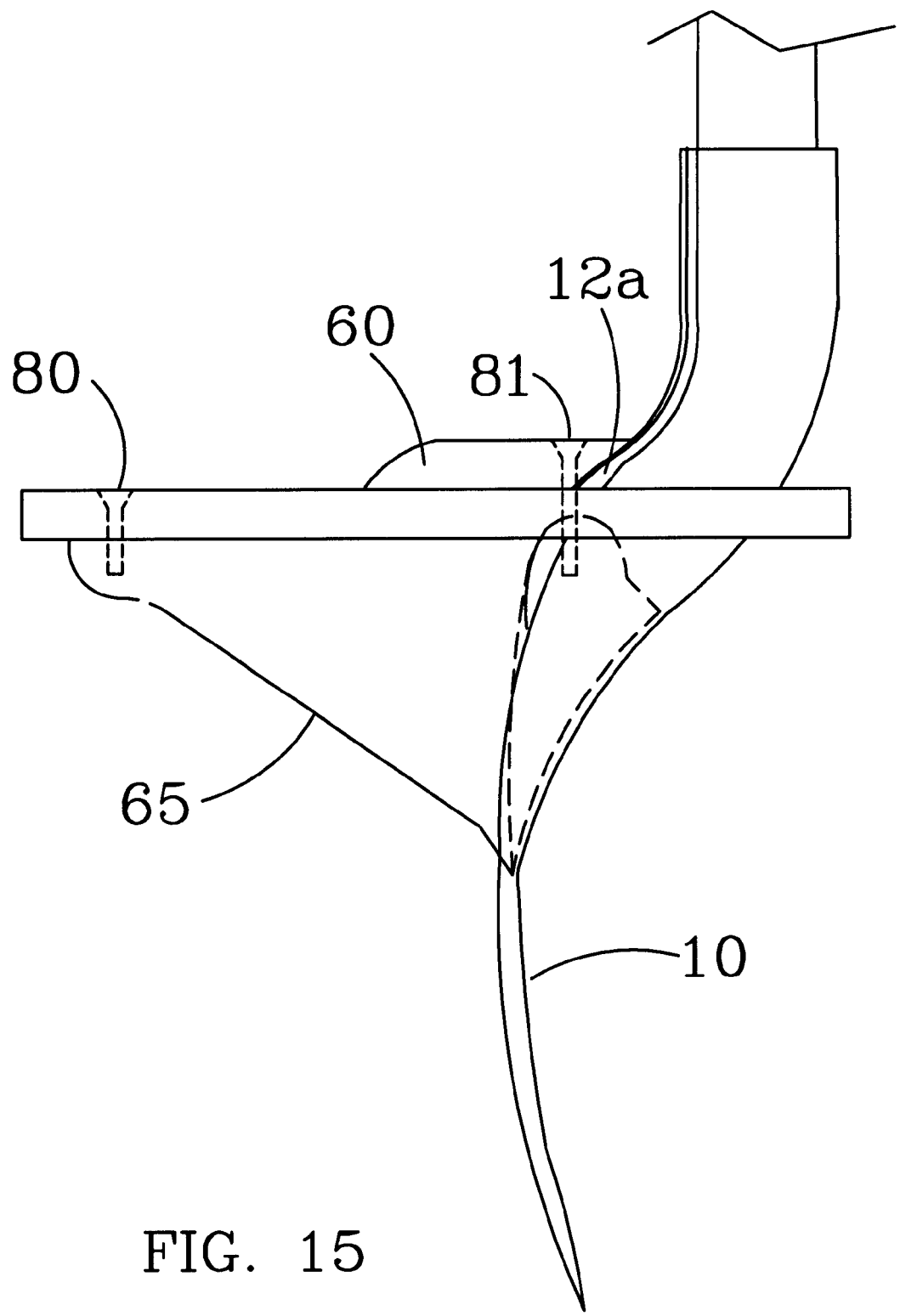
FIG. 15 shows the second embodiment foot attachment mounted on a shovel.

FIG. 15 shows the shovel foot plate attachment made up of plate 50, support 65 and cap 60 assembled and mounted on shovel 10. With a part of support in recess 12a of shovel 10, and with screws 80 and 81 securing parts 50 and 60 to support 65, the foot plate attachment is securely attached to shovel 10.

Figure 16:
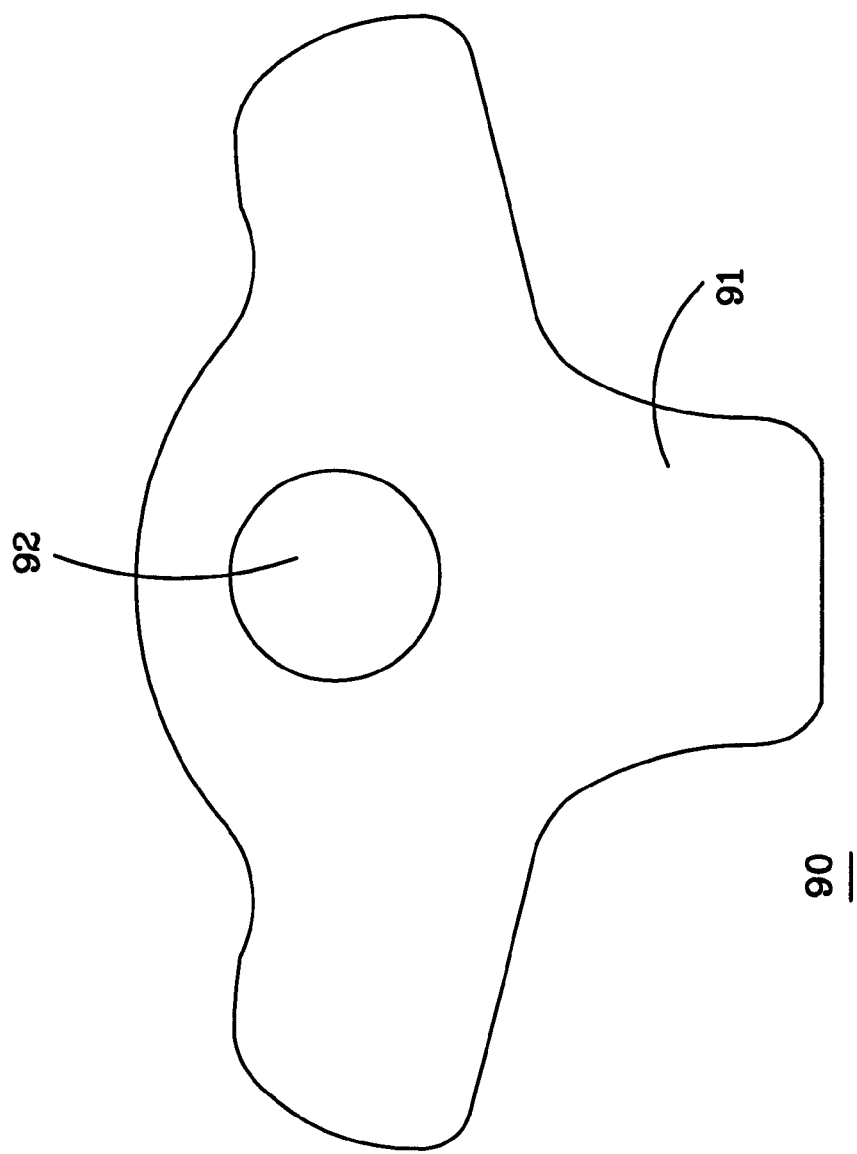
FIG. 16 shows a top view of a foot attachment which is a single piece having a support integral with the foot plate.

FIG. 16 shows a foot attachment that is a single body 90 having a plate 91 that is shape similar to the plate described with reference to FIG. 2. Plate 91 has an opening 92 through which a shovel handle is inserted to allow foot attachment 90 to slide down the shovel handle against the shovel blade 11 and shoulders 14 and 15 (FIG. 1).

Figure 17:
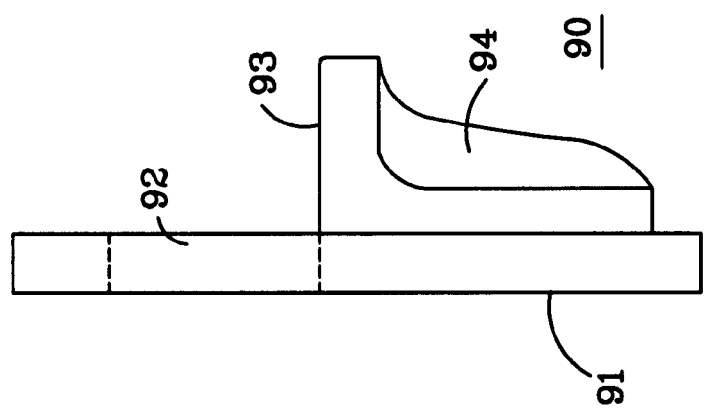
FIG. 17 is a side view of the foot attachment of FIG. 16.

FIG. 17 is a side view of attachment 90 showing plate 91 with a support part 93, 94 under plate 91. When attachment is placed on a shovel, such as the shovel illustrated in FIG. 1, plate 91 will rest on shoulders 14 and 15, and support part 93 will be against the back side of shovel blade 11. When mounted on a shovel, attachment 90 will be positioned on a shovel similar to that which is illustrated in FIG. 8, except that no retention screw is necessary to hold attachment in place.

What is claimed is:

1. An attachment device for a shovel having a blade with front and back sides, a pair of shoulders on the blade and a handle mounted in a cylinder extending upward from the blade and shoulders, comprising:

a plate having an opening therein through which the shovel handle is inserted, said plate having a portion thereof extending outward from the backside of the shovel; and a support part under said plate, attached to the portion extending outward from the backside of the shovel for providing support for said plate against the back side of the shovel blade.

2. The attachment device according to claim 1, wherein the plate and support are separate pieces having interlocking notches.

3. The attachment device according to claim 1, wherein there is at least one screw securing the plate to the support.

4. The attachment device according to claim 1, wherein said plate has a textured surface to prevent a foot, when applied to the plate, from slipping on the plate.

5. The attachment device according to claim 1, wherein said support part, when mounted on a shovel, extends downward and braces against the back side of the blade when pressure is applied to the plate during digging.

6. An attachment device for a shovel having a blade, a pair of shoulders on the blade and a handle mounted in a cylinder extending upward from the blade and shoulders, comprising:

a plate having an opening therein, and a channel extending from the opening to one edge of the plate, for mounting around the shovel handle and over the shovel shoulders;

an insert having raised ridges that mount in the channel in the plate, said insert secured to said plate by at least one screw;

a securing screw in said insert for engaging the shovel blade for holding the plate and insert in place on the shovel; and interlocking notches on the plate and insert to prevent lateral movement between the plate and insert.

7. The attachment device according to claim 6, wherein there is one screw on each side of said channel securing the plate to the insert.

8. The attachment device according to claim 6, wherein said plate has a textured surface to prevent a foot, when applied to the plate, from slipping on the plate.

9. The attachment device according to claim 6, wherein said insert, when mounted on a shovel, extends downward and braces against the blade when pressure is applied to the plate during digging.

10. An attachment device for a shovel having a blade, a pair of shoulders on the blade and a handle mounted in a cylinder extending upward from a concave portion of the blade and shoulders, comprising:

a plate having an opening therein for mounting around the shovel handle and over the shovel shoulders;

a support for mounting under the plate, and having an end that extends into a concave portion of the shovel blade; and a cap mounted on the plate and secured to the support by a screw.

11. The attachment device according to claim 10, including a second screw attaching the plate to the support.

12. The attachment device according to claim 10, wherein said plate has a textured surface to prevent a foot, when applied to the plate, from slipping on the plate.

13. The attachment device according to claim 10, wherein said plate has a recessed portion in which said cap is mounted.

14. The attachment device according to claim 10, wherein said cap has a recess therein into which a portion of the handle mount cylinder resides when the attachment device is mounted on the shovel.

* * * * *